(12) United States Patent
Ge et al.

(10) Patent No.: US 11,204,446 B2
(45) Date of Patent: Dec. 21, 2021

(54) ANTI-REFLECTION FILM AND AN OPTICAL COMPONENT CONTAINING THE ANTI-REFLECTION FILM

(71) Applicants: HANGZHOU MDK OPTO ELECTRONICS CO.,LTD, Hangzhou (CN); Corporation NW, Yokohama (JP)

(72) Inventors: Wenzhi Ge, Hangzhou (CN); Ryuji Kimura, Tajimi (JP)

(73) Assignees: HANGZHOU MDK OPTO ELECTRONICS CO., LTD, Hangzhou (CH); CORPORATION NW, Yokohama (JP)

( * ) Notice: Subject to any disclaimer, the term of this patent is extended or adjusted under 35 U.S.C. 154(b) by 29 days.

(21) Appl. No.: 16/736,784

(22) Filed: Jan. 7, 2020

(65) Prior Publication Data
US 2020/0264338 A1      Aug. 20, 2020

(30) Foreign Application Priority Data
Jan. 7, 2019   (CN) .......................... 201910012614.4

(51) Int. Cl.
*G02B 1/11* (2015.01)
*G02B 5/02* (2006.01)
(Continued)

(52) U.S. Cl.
CPC ................ *G02B 1/11* (2013.01); *G02B 1/111* (2013.01); *G02B 1/14* (2015.01); *G02B 5/0294* (2013.01); *Y10T 428/2495* (2015.01)

(58) Field of Classification Search
CPC .............. G02B 1/11–115; B32B 7/023; Y10T 428/00–8305; C03C 17/28–42
See application file for complete search history.

(56) References Cited

U.S. PATENT DOCUMENTS 3,356,522 A * 12/1967 Libbert .................. G02B 1/115
428/412
3,356,523 A * 12/1967 Libbert .................. G03C 1/825
359/589

(Continued)

FOREIGN PATENT DOCUMENTS

JP      2004258267 A  *  9/2004

OTHER PUBLICATIONS

Machine translation of JP2004-258267. Retrieved Jun. 2, 2015.*

*Primary Examiner* — Prashant J Khatri
(74) *Attorney, Agent, or Firm* — Bayramoglu Law Offices LLC

(57) ABSTRACT

An antireflection film is arranged on a surface of a substrate layer. The antireflection film includes a multilayer film arranged on the surface of the substrate layer and a protective film arranged outside the multilayer film. The multilayer film is formed by stacking two or three low-reflection layers. Two protective films are successively arranged outside the multilayer film of the antireflection film. An optical component includes the antireflection film arranged on both sides or one side of an optical filter of the optical component. The high-performance antireflection film can be obtained with respect to a broadband wavelength ranging from 400 nm to 800 nm, and the antireflection film can reduce the occurrence of ghosts or flare when used in an optical system.

12 Claims, 3 Drawing Sheets

(51) Int. Cl.
  *G02B 1/111* (2015.01)
  *G02B 1/14* (2015.01)

(56) References Cited

U.S. PATENT DOCUMENTS

| | | | | |
|---|---|---|---|---|
| 5,190,807 | A | * | 3/1993 | Kimock .................. C23C 16/26 428/216 |
| 9,310,525 | B2 | * | 4/2016 | Shibuya .................... G02B 1/11 |
| 2009/0220774 | A1 | * | 9/2009 | Imai .................... C23C 18/1283 428/331 |

* cited by examiner

ANTI-REFLECTION FILM AND AN OPTICAL COMPONENT CONTAINING THE ANTI-REFLECTION FILM

CROSS REFERENCE TO THE RELATED APPLICATIONS

This application is based upon and claims priority to Chinese Patent Application No. 201910012614.4, filed on Jan. 7, 2019, the entire contents of which are incorporated herein by reference.

TECHNICAL FIELD

The present disclosure relates to the technical field of optical devices, and specifically to an antireflection film and an optical component including the antireflection film.

BACKGROUND

Most of the optical elements such as lenses and optical filters in an optical system are made of transparent materials (substrates) such as optical glass or optical plastic. When the reflectance of the light incident surface and the light emitting surface becomes higher the refractive index of the substrate increases. When an optical element with a higher reflectance of the light incident surface and the light emitting surface is used, the effective amount of light reaching the image surface is decreased, and the undesired light reflected from the light incident surface and the light emitting surface of the optical element falls on the image surface to form ghosts and flare, resulting in a decline in the optical performance of the optical system. Therefore, the optical component using the substrate has the function of preventing reflection on the light incident surface and the light emitting surface thereof.

In addition, the undesired ghosts and flare on the image surface caused by the reflection of the light incident surface and the light emitting surface may be substantially altered according to the incident angle of the light beam and the shape of the optical element. Therefore, an antireflection film is provided on the substrate to produce an effective antireflection in a wide wavelength range and at each chief ray angle (CRA). It is known to coat several stacked dielectric antireflection film layers onto the light incident surface and the light emitting surface of the substrate. In general, the antireflection film has more stacked layers. The antireflection effect is, therefore, better and the wavelength band of antireflection film is wider as a result.

Furthermore, a material used in vapor deposition films, such as the material having a refractive index lower than the refractive index 1.38 of $MgF_2$, is used as the outermost layer (closest to the air layer) of the antireflection film, which can achieve a high antireflection performance. Besides, materials having a low refractive index, including the commonly used inorganic materials such as Si and Mg and organic materials such as silicon resin and amorphous fluorine resin, can reduce the refractive index due to the voids formed in the layer. For example, in the prior art, the antireflection film with the fluorine resin is found to reduce the refractive index to 1.3 with respect to the wavelength range of 400 nm to 700 nm, and the nine-layer antireflection film, which uses the magnesium fluoride film as the outermost layer, is found to reduce the refractive index to approximately 1.2 with respect to the wavelength range of 400 nm to 700 nm.

In some multilayer films using vapor deposition, the reflectance is reduced within the broadband wavelength range of 400 nm to 730 nm, which needs a large number of film layers to obtain a good antireflection function. If the number of film layers is increased, when the light falls at a particular inclined angle, it is difficult to obtain a good reflection effect within a broadband wavelength range due largely to the influence of the visible range ripple and wavelength shift. A low refractive index material is arranged on the outermost layer to reduce the reflectance within the broadband wavelength range of 400 nm to 730 nm, so as to obtain a good antireflection function. Though the film provided with the low refractive index material can be produced by the Sol-Gel method, the film produced by using the Sol-Gel method is so fragile that it is difficult to perform wiping operations and the like required for assembling the camera.

SUMMARY

In order to solve the above-mentioned problems, the present disclosure provides an antireflection film having a good antireflection performance and film strength within a broadband wavelength range. The invention also provides an optical component and system including the antireflection film.

In order to achieve the above-mentioned objective, the present disclosure employs the following technical solutions. An antireflection film, wherein the antireflection film is arranged on a surface of a substrate layer. The antireflection film includes a multilayer film arranged on the surface of the substrate layer and a protective film arranged outside the multilayer film. The multilayer film is formed by stacking two or three low-reflection layers. The refractive index of the substrate layer ranges from 1.43 to 1.70. When the multilayer film includes two low-reflection layers, a first low-reflection layer of the two low-reflection layers has a refractive index of 1.30 to 1.50 and an optical film thickness of 60 nm to 180 nm, and a second low-reflection layer of the two low-reflection layers has a refractive index of 1.15 to 1.23 and an optical film thickness of 60 nm to 120 nm. When the multilayer film includes three low-reflection layers, the first low-reflection layer of the three low-reflection layers has a refractive index of 1.30 to 1.70 and an optical film thickness of 30 nm to 170 nm, the second low-reflection layer has a refractive index of 1.30 to 1.50 and an optical film thickness of 80 nm to 120 nm, and the third low-reflection layer of the three low-reflection layers has a refractive index of 1.15 to 1.23 and an optical film thickness of 80 nm to 120 nm. Two protective films are successively arranged outside the multilayer film of the antireflection film. A first protective film of the two protective films has a refractive index of 1.30 to 2.40 and an optical film thickness of below 20 nm, and a second protective film of the two protective films has a refractive index of 1.30 to 1.60 and an optical film thickness of 10 nm to 30 nm.

Preferably, the refractive index of the substrate layer and the multilayer film is set and obtained under the d-line of the Helium (He) light source, and the wavelength of the d-line is 587.56 nm.

Preferably, the maximum reflectance of the antireflection film with respect to light at an incident angle of 0° does not exceed 0.2%, and the minimum reflectance does not exceed 0.1%; and the wavelength of the light ranges from 450 nm to 600 nm.

Preferably, the maximum reflectance of the antireflection film with respect to the light at the incident angle of 0° does not exceed 0.2%, wherein the wavelength of the light ranges from 380 nm to 780 nm.

Preferably, the multilayer film and the protective film are made of two or three materials with different refractive indices; the film layer with the refractive index of 1.30 to 1.70 is composed of a monomer of silicon (Si), magnesium (Mg), and aluminum (Al), or a mixture of Si, Mg, and Al; and the film layer with the refractive index of 1.15 to 1.23 is composed of a monomer of an oxide of silicon or a mixture containing the monomer of the oxide of silicon.

Preferably, when the multilayer film includes two low-reflection layers, the second low-reflection layer of the two low-reflection layers is composed of hollow microparticles containing Si; when the multilayer film includes three low-reflection layers, the third low-reflection layer of the three low-reflection layers is composed of hollow microparticles containing Si.

Preferably, when the multilayer film includes two low-reflection layers or three low-reflection layers, the first low-reflection layer is composed of a monomer of $SiO_2$, $MgF_2$, and $Al_2O_5$ or a mixture thereof.

An optical component including the antireflection film, wherein the antireflection film is arranged on both sides or one side of an optical filter of the optical component.

The antireflection film of the present disclosure is composed of four or five layers, and formed on at least one of a light incident surface or a light emitting surface of a substrate made of a material having a refractive index of 1.30 to 1.70 and a reference wavelength of 550 nm. The first layer, the second layer, the third layer, the fourth layer, and the fifth layer are successively arranged from the substrate side to the air side. The refractive index is set as the refractive index of the reference wavelength, and the optical film thickness=(refractive index of the reference wavelength)×(thickness). In the present disclosure, the refractive index of each layer and the optical film thickness are appropriately set, and the antireflection film has a maximum reflectance of below 0.2% at the incident angle of 0° and a wavelength ranging from 420 nm to 730 nm.

In the antireflection film of the present disclosure, the first layer of the multilayer film is in contact with the substrate layer and is susceptible to the refractive index of the substrate layer. Preferably, the refractive index of the first layer is set to be smaller than the refractive index of the substrate layer. When the refractive index n1 of the first layer is greater than the refractive index n2 of the second layer, the sensitivity of reflection characteristics can be reduced. Moreover, the refractive index of the second layer is preferably higher than the refractive index of the third layer. In addition, since the refractive index of the two protective films needs to be reduced, the two protective films are the low refractive index layer made of a low refractive index material, and are preferably made of hollow microparticles containing the main component of Si, wherein the main component is indicative of a component with a weight ratio of 50% or more.

The hollow microparticles are bonded by an adhesive. Since the hollow microparticles have voids (pores) inside, the refractive index can be reduced due to the air (having the refractive index of 1.0) in the voids. For the pores, a single pore or multiple pores can be used and selected appropriately. Moreover, the voids inside the hollow microparticles can prevent the hollow microparticles from adsorbing moisture and impurities to obtain stable optical characteristics such as good environmental resistance and less change in the refractive index. Preferably, the hollow microparticles are bonded to an adhesive by the Sol-Gel method. The coating method is not specifically limited, and includes general coating methods for liquid coating materials such as the dip coating method, the spin coating method, the spray coating method, and the roll coating method. In order to coat a film with a uniform thickness on a substrate with a curved surface such as a lens, the film is preferably coated by using the spray coating method. After being coated, the film is dried by a dryer, a hot plate, an electric furnace or the like. The substrate is not affected by the drying conditions, and the drying conditions provide the temperature and time for the organic solvent in the hollow particles to evaporate. Thus, the temperature is generally set below 300° C. The film is usually coated once, or dried and coated multiple times.

When the antireflection film of the present disclosure is produced, a metal film is plated on the substrate (i.e., the substrate layer) to improve the adhesion between the coating layer (i.e., the antireflection film) and the substrate. The material of the metal film is preferably Si, Mg, and Al. Coating methods may include the ion assisted deposition (IAD) method or the rugged anti-scratch (RAS) method. Moreover, the hard coating film is formed by a step, or incremental, method (i.e., a method of gradually increasing the temperature) for heating under firing conditions, and the air preferably containing $N_2$ and others is injected. In order to suppress film thickness deviation and stains, the substrate should be coated in a closed space, which is advantageous to the solvent air. The solvent air is preferably in a saturated state. In addition, the rotation speed is increased to ensure the uniformity of the film, e.g., the rotation speed is 2,000 rpm, and preferably 6,000 rpm or more. The coated film is likely to be degraded if it is touched before being fired. The coated film is preferably fired on one side separately. For example, the film can be coated by suppressing the periphery of the substrate without touching the substrate even if the opposite surface is not fired. Therefore, in order to coat the film without touching the opposite surface at this time, both sides are coated before being fired, which is conducive to improving the efficiency of this process.

When the film is coated by using the RAS method, an adhesive film is employed to hold the film. However, at this time, the adhesive material adheres to the substrate surface and a certain temperature is required during the film coating process. Therefore, the transfer effect of the adhesive material is significantly improved, so as to reduce the surface quality. For this, a coating fixture is available.

In continuous production, sometimes the coating liquid is exposed to the air for a long time at room temperature. For example, the low-refractive-index material in the sol-gel method causes a reaction due to environmental factors, the ratio of the solid portion in the standby process is increased, and the coated film is likely to be broken. In order to avoid this situation, the solvent air is used to manage the air of the coating liquid in the standby process. When the substrate is coated by an automatic injector in some cases, the liquid is preferably dripped within a short time at one time. In order to suppress appearance defects, such as stripes and stains, caused by coating for a long time, the distance between the substrate and the automatic injector is preferably 3 mm to 10 mm, and the coating liquid is dripped within 5 s, and preferably within 1 s. In order to improve the yield of the coated substrate, the coating liquid is preferably uniformly coated around the periphery of the substrate. At this time, the coating liquid is preferably 0.03 cc/80 $mm^2$ to 1.0 cc/80 $mm^2$. In addition, the coating amount is minimized by adjusting the rotation speed, thereby reducing the loss of the coating liquid and reducing the material cost.

The antireflection film of the present disclosure can be cut by a general method, but the antireflection film needs to be fixed by a strong adhesive film such as an ultraviolet (uv)

adhesive tape when cut by using these methods. At this time, the adhesive material is transferred to the antireflection film to produce a performance abnormality such as appearance defects and changes of spectral characteristics. In order to deal with these problems, the selection of the adhesive tape and cleaning methods after the antireflection film is key. For example, the tape with relatively weak adhesion is used for fixing the film before cutting, and the uv cleaning method is available.

Therefore, the present disclosure has the following advantages: the high-performance high-antireflection film with respect to a broadband wavelength range of 400 nm to 800 nm can reduce the occurrence of ghosts or flare when used in an optical system.

Figure 1:
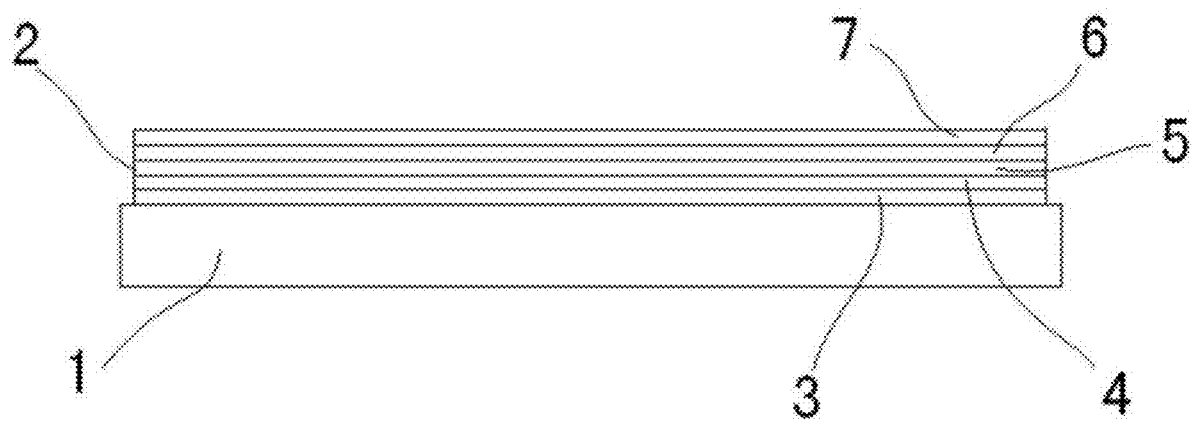
FIG. 1 is a structural schematic diagram of the present disclosure.

In the drawings: 1, substrate layer; 2, antireflection film; 3, first low-reflection layer;

4, second low-reflection layer; 5, third low-reflection layer; 6, first protective film; and 7, second protective film.

DETAILED DESCRIPTION OF THE EMBODIMENTS

The present disclosure will be further described hereinafter with reference to the drawings.

An antireflection film, wherein the antireflection film is arranged on a surface of a substrate layer. The antireflection film includes a multilayer film arranged on the surface of the substrate layer and a protective film arranged outside the multilayer film. The multilayer film is formed by stacking two or three low-reflection layers. The refractive index of the substrate layer ranges from 1.43 to 1.70. When the multilayer film includes two low-reflection layers, a first low-reflection layer of the two low-reflection layers has a refractive index of 1.30 to 1.50 and an optical film thickness of 60 nm to 180 nm, and a second low-reflection layer of the two low-reflection layers has a refractive index of 1.15 to 1.23 and an optical film thickness of 60 nm to 120 nm.

When the multilayer film includes three low-reflection layers, the first low-reflection layer of the three low-reflection layers has a refractive index of 1.30 to 1.70 and an optical film thickness of 30 nm to 170 nm. The second low-reflection layer has a refractive index of 1.30 to 1.50 and an optical film thickness of 80 nm to 120 nm. The third low-reflection layer of the three low-reflection layers has a refractive index of 1.15 to 1.23 and an optical film thickness of 80 nm to 120 nm.

Two protective films are successively arranged outside the multilayer film of the antireflection film. A first protective film of the two protective films has a refractive index of 1.30 to 2.40 and an optical film thickness of below 20 nm, and a second protective film of the two protective films has a refractive index of 1.30 to 1.60 and an optical film thickness of 10 nm to 30 nm.

The refractive index of the substrate layer and the multilayer film is set and obtained under the d-line of the Helium (He) light source, and the wavelength of the d-line is 587.56 nm.

The maximum reflectance of the antireflection film with respect to light at an incident angle of 0° does not exceed 0.2%, and the minimum reflectance does not exceed 0.1%. The wavelength of the light ranges from 450 nm to 600 nm.

The maximum reflectance of the antireflection film with respect to the light at the incident angle of 0° does not exceed 0.2%, wherein the wavelength of the light ranges from 380 nm to 780 nm.

The multilayer film and the protective film are made of two or three materials with different refractive indices. The film layer with the refractive index of 1.30 to 1.70 is composed of a monomer of silicon (Si), magnesium (Mg), and aluminum (Al), or a mixture of Si, Mg, and Al; and the film layer with the refractive index of 1.15 to 1.23 is composed of a monomer of an oxide of silicon or a mixture containing the monomer of the oxide of silicon.

When the multilayer film includes two low-reflection layers, the second low-reflection layer of the two low-reflection layers is composed of hollow microparticles containing Si. When the multilayer film includes three low-reflection layers, the third low-reflection layer of the three low-reflection layers is composed of hollow microparticles containing Si.

When the multilayer film includes two low-reflection layers or three low-reflection layers, the first low-reflection layer is composed of a monomer of $SiO_2$, $MgF_2$, and $Al_2O_5$ or a mixture thereof.

An optical component including the antireflection film, wherein the antireflection film is arranged on both sides or one side of an optical filter of the optical component including the antireflection film.

In the first embodiment, as shown in FIG. 1, the antireflection film 2 provided on the substrate layer 1 includes a five-layer structure, i.e., the first low-reflection layer 3, the second low-reflection layer 4, and the third low-reflection layer 5 belonging to the multilayer film, and the first protective film 6 and the second protective film 7 belonging to the protective film.

Figure 2:
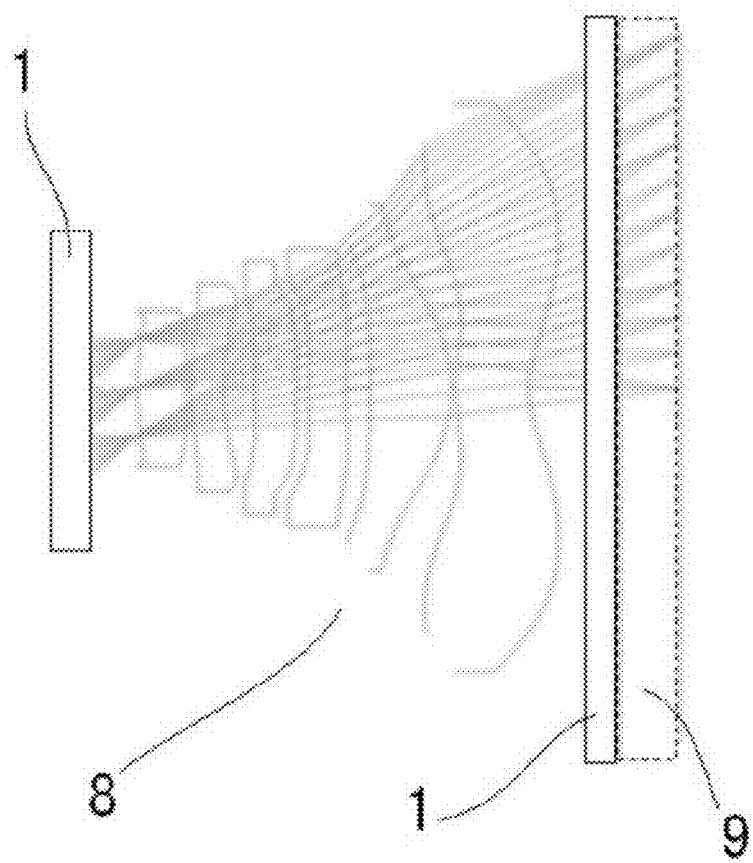
FIG. 2 is a structural schematic diagram of the optical component of the present disclosure.
Figure 3:
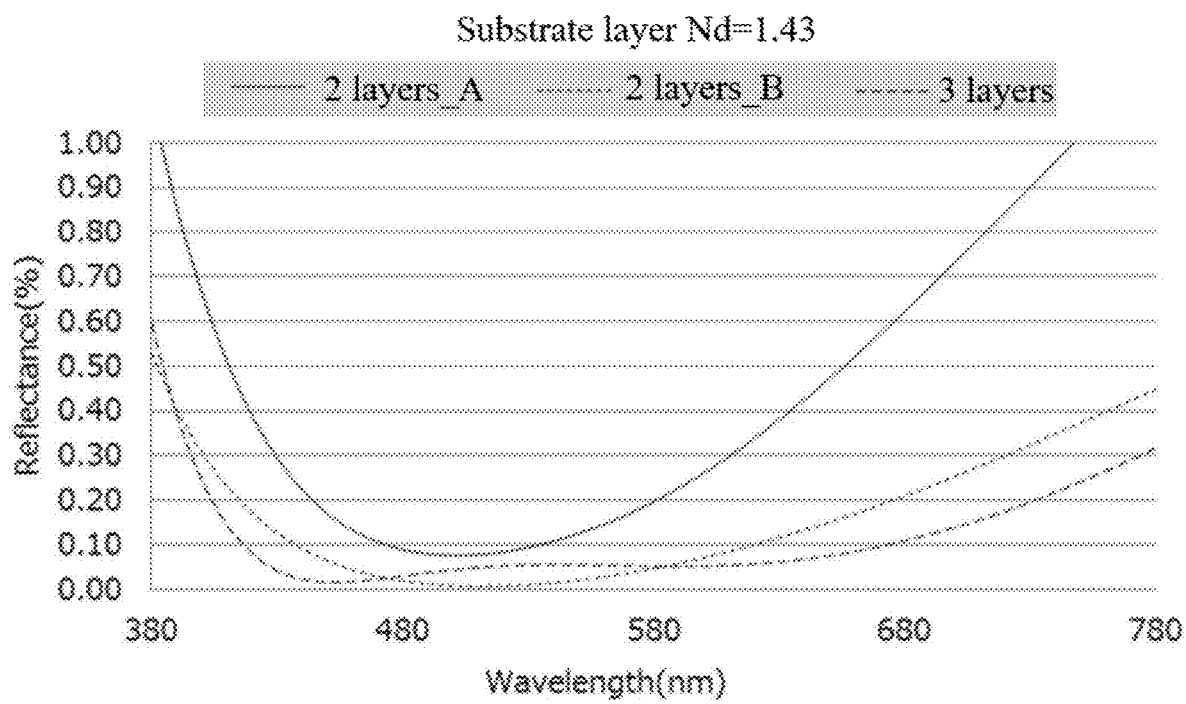
FIG. 3 is a first schematic diagram showing the reflectance characteristic of the antireflection film of the present disclosure.
Figure 4:
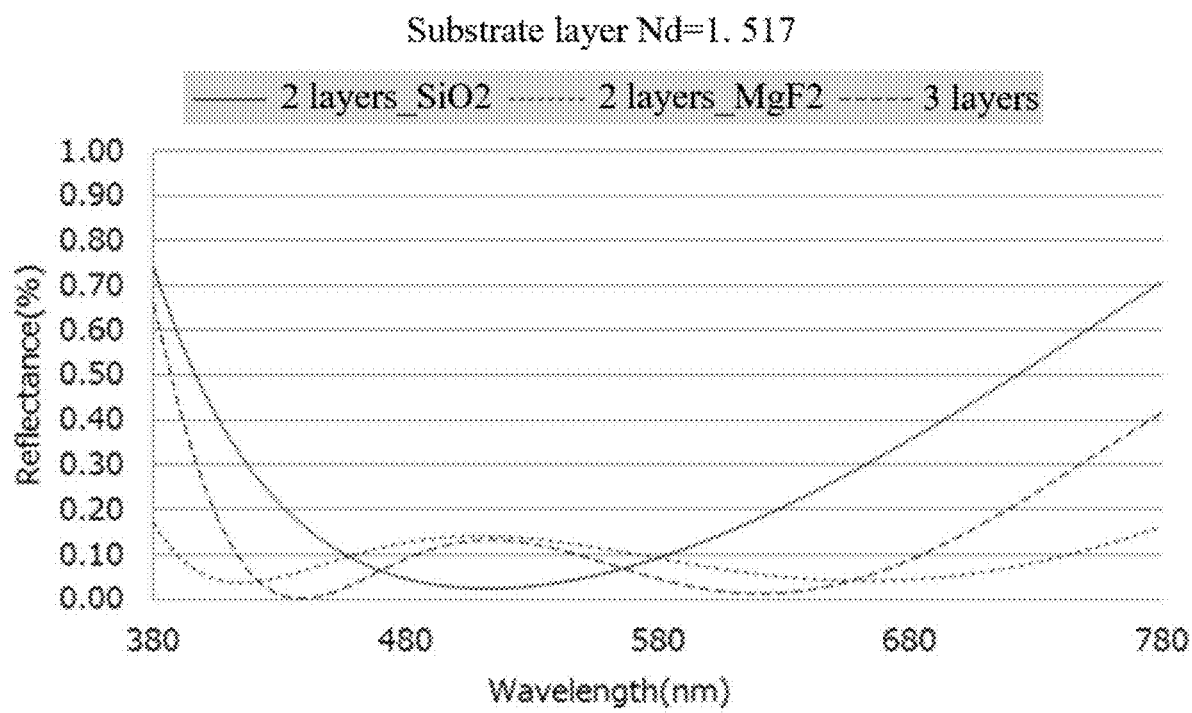
FIG. 4 is a second schematic diagram showing the reflectance characteristic of the antireflection film of the present disclosure.
Figure 5:
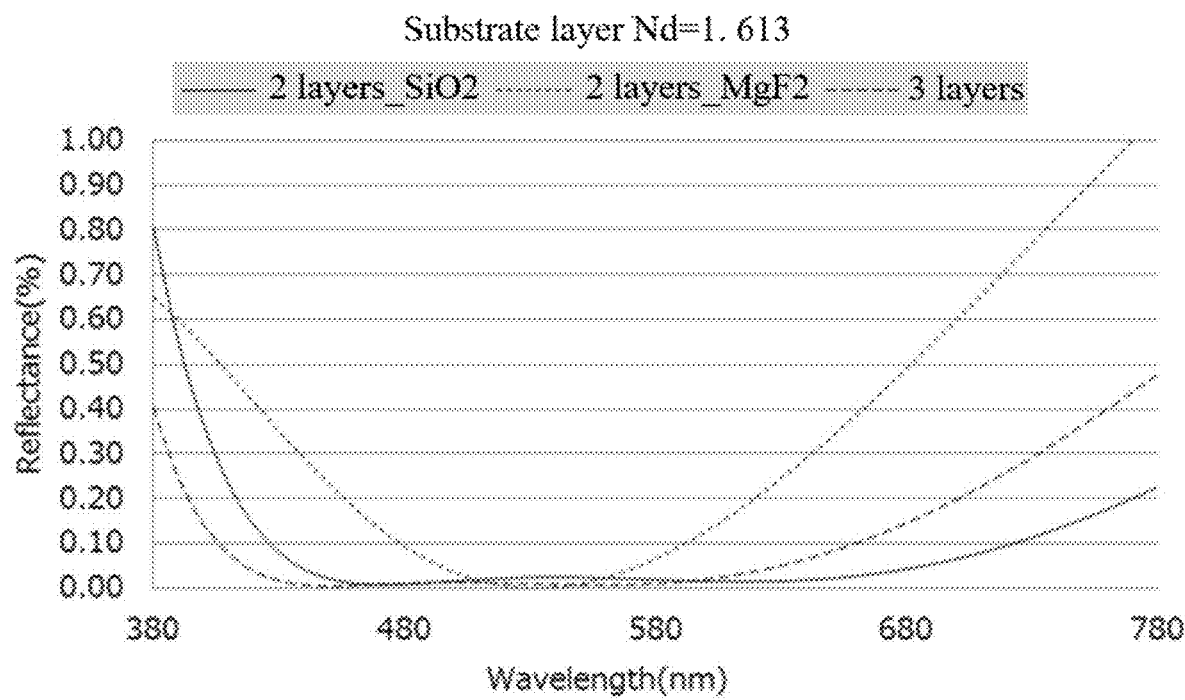
FIG. 5 is a third schematic diagram showing the reflectance characteristic of the antireflection film of the present disclosure.
Figure 6:
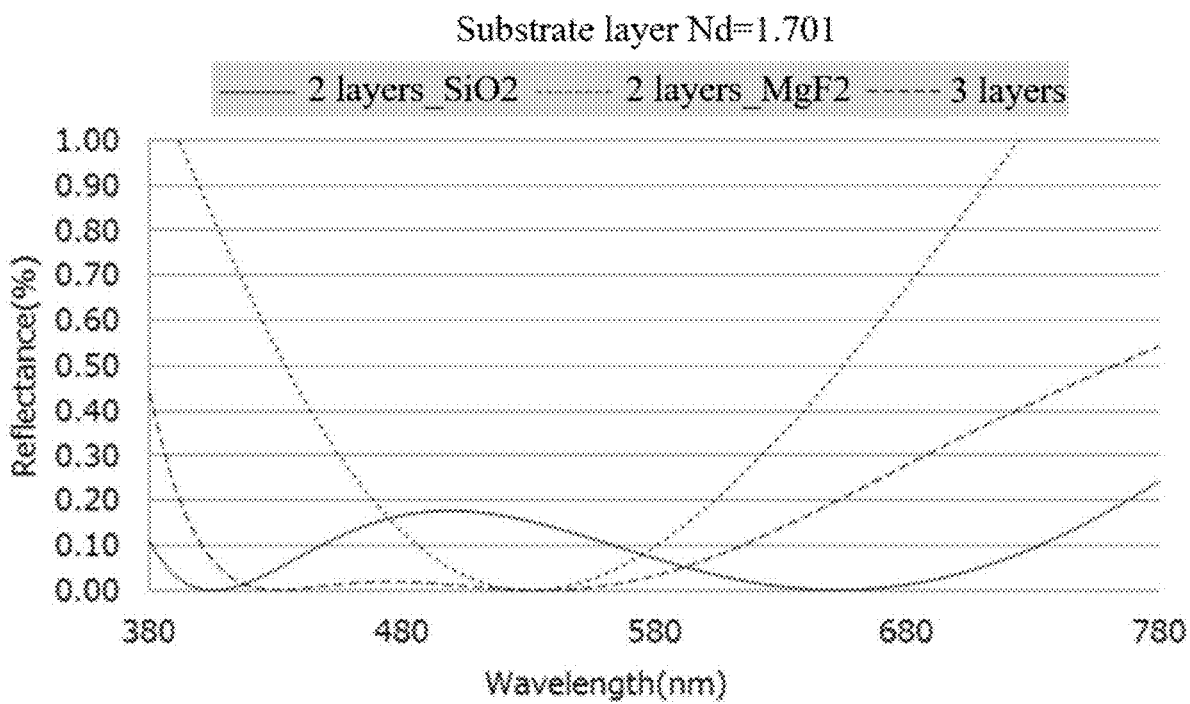
FIG. 6 is a fourth schematic diagram showing the reflectance characteristic of the antireflection film of the present disclosure.

In the second embodiment, FIG. 1 and FIG. 2 show the structure of the optical component 8 using the substrate layer 1 and the antireflection film 2 of the present invention. One end of the optical component 8 is in contact with the air layer 9, and the substrate layer 1 is provided at both ends of the optical component 8. The optical component 8 includes the antireflection film 2 provided on at least one of the light incident surface and the light emitting surface of the substrate layer 1 in addition to a lens, an optical filter, and the like. The antireflection film 2 is formed by the first low-reflection layer 3, the second low-reflection layer 4, the third low-reflection layer 5, the first protective film 6 and the second protective film 7 which are successively stacked on the substrate layer 1 from a side of the substrate layer 1 to a side of the air layer 9.

The implementation process is specifically as follows, in the present embodiment, the first low-reflection layer 3 or the first low-reflection layer 3 to the second low-reflection layer 4 are formed into a film by a vacuum coating method or spin coating. The refractive index of the first low-reflection layer 3 or the first low-reflection layer 3 to the second low-reflection layer 4 is 1.35 to 1.45, and the first low-reflection layer or the first low-reflection layer 3 to the second low-reflection layer 4 are composed of one or two materials. In addition, the second low-reflection layer 4 or the third low-reflection layer 5 is formed by spin-coating and firing a mixed adjustment solution containing hollow $SiO_2$ for 1 h, wherein the refractive index of the mixed adjustment solution is adjusted to 1.16. In addition, the first protective film 6 and the second protective film 7 are formed by sputtering. The two protective films have a refractive index of 1.30 to 1.48 and are composed of two materials, and a fluoride film is arranged on the outermost layer.

FIG. 3, FIG. 4, FIG. 5, and FIG. 6 show the reflectance characteristics of the first embodiment at the incident angle of 0° within the wavelength range of 380 nm to 780 nm, and the characteristic that the refractive index of the substrate layer is 1.43, 1.52, 1.61, 1.70. Within the wavelength range of 380 nm to 780 nm, the antireflection film of the first embodiment has a wavelength width of 130 nm to 400 nm when the reflectance is 0.2% or less and has a wavelength width of 60 nm to 350 nm when the reflectance is 0.1% or less.

What is claimed is:

1. An antireflection film, comprising:
    a multilayer film, arranged on a surface of a substrate layer, and
    two protective films, arranged outside the multilayer film; wherein
    the multilayer film is formed by stacking two or three low-reflection layers; a refractive index of the substrate layer ranges from 1.43 to 1.70;
    when the multilayer film comprises two low-reflection layers, a first low-reflection layer of the two low-reflection layers has a first refractive index of 1.30 to 1.50 and a first optical film thickness of 60 nm to 180 nm, and a second low-reflection layer of the two low-reflection layers has a second refractive index of 1.15 to 1.23 and a second optical film thickness of 60 nm to 120 nm;
    when the multilayer film comprises three low-reflection layers, a first low-reflection layer of the three low-reflection layers has a third refractive index of 1.30 to 1.70 and a third optical film thickness of 30 nm to 170 nm, a second low-reflection layer of the three low-reflection layers has a fourth refractive index of 1.30 to 1.50 and a fourth optical film thickness of 80 nm to 120 nm, and a third low-reflection layer of the three low-reflection layers has a fifth refractive index of 1.15 to 1.23 and a fifth optical film thickness of 80 nm to 120 nm; the two protective films are successively arranged outside the multilayer film of the antireflection film; a first protective film of the two protective films has a sixth refractive index of 1.30 to 2.40 and a sixth optical film thickness of below 20 nm, and a second protective film of the two protective films has a seventh refractive index of 1.30 to 1.60 and a seventh optical film thickness of 10 nm to 30 nm; and wherein the refractive index of the substrate layer and a refractive index of the multilayer film are set and obtained under a d-line of a Helium (He) light source, and a wavelength of the d-line is 587.56 nm.

2. The antireflection film according to claim 1, wherein, a maximum reflectance of the antireflection film with respect to light at an incident angle of 0° does not exceed 0.2%, and a minimum reflectance of the antireflection film with respect to the light at the incident angle of 0° does not exceed 0.1%; and a wavelength of the light ranges from 450 nm to 600 nm.

3. The antireflection film according to claim 1, wherein, a maximum reflectance of the antireflection film with respect to light at an incident angle of 0° does not exceed 0.2%, and a wavelength of the light ranges from 380 nm to 780 nm.

4. The antireflection film according to claim 1, wherein, the multilayer film and the two protective films are made of two or three materials with different refractive indices; the first low-reflection layer of the multilayer film comprising three low-reflection layers is composed of a monomer of silicon (Si), magnesium (Mg), and aluminum (Al), or a mixture of Si, Mg, and Al; and the second low-reflection layer of the multilayer film comprising two low-reflection layers or the third low-reflection layer of the multilayer film comprising three low-reflection layers is composed of a monomer of an oxide of silicon or a mixture containing the monomer of the oxide of silicon.

5. The antireflection film according to claim 1, wherein, when the multilayer film comprises the two low-reflection layers, the second low-reflection layer of the two low-reflection layers is composed of hollow microparticles containing Si; when the multilayer film comprises the three low-reflection layers, the third low-reflection layer of the three low-reflection layers is composed of the hollow microparticles containing Si.

6. The antireflection film according to claim 1, wherein, when the multilayer film comprises the two low-reflection layers or the three low-reflection layers, the first low-reflection layer is composed of a monomer of $SiO_2$, $MgF_2$, and $Al_2O_5$ or a mixture of $SiO_2$, $MgF_2$, and $Al_2O_5$.

7. An optical component including the antireflection film according to claim 1, wherein the antireflection film is arranged on both sides or one side of an optical filter of the optical component.

8. The optical component according to claim 7, wherein, a maximum reflectance of the antireflection film with respect to light at an incident angle of 0° does not exceed 0.2%, and a minimum reflectance of the antireflection film with respect to the light at the incident angle of 0° does not exceed 0.1%; and a wavelength of the light ranges from 450 nm to 600 nm.

9. The optical component according to claim 7, wherein, a maximum reflectance of the antireflection film with respect to light at an incident angle of 0° does not exceed 0.2%, and a wavelength of the light ranges from 380 nm to 780 nm.

10. The optical component according to claim 7, wherein, the low-reflection layers and the two protective films are made of two or three materials with different refractive indices; a first film layer of the multilayer film and the two protective films is composed of a monomer of silicon (Si), magnesium (Mg), and aluminum (Al), or a mixture of Si, Mg, and Al.

11. The optical component according to claim 7, wherein, when the multilayer film comprises the two low-reflection layers, the second low-reflection layer of the two low-reflection layers is composed of hollow microparticles containing Si; when the multilayer film comprises the three low-reflection layers, the third low-reflection layer of the three low-reflection layers is composed of the hollow microparticles containing Si.

12. The optical component according to claim 7, wherein, when the multilayer film comprises the two low-reflection layers or the three low-reflection layers, the first low-reflection layer is composed of a monomer of $SiO_2$, $MgF_2$, and $Al_2O_5$ or a mixture of $SiO_2$, $MgF_2$, and $Al_2O_5$.

\* \* \* \* \*